(12) United States Patent
Kaul

(10) Patent No.: US 8,903,941 B1
(45) Date of Patent: Dec. 2, 2014

(54) METHOD AND APPARATUS FOR SAFE WEB BROWSING

(75) Inventor: Prateek Kaul, Pune (IN)

(73) Assignee: Symantec Corporation, Mountain View, CA (US)

(*) Notice: Subject to any disclaimer, the term of this patent is extended or adjusted under 35 U.S.C. 154(b) by 1008 days.

(21) Appl. No.: 12/558,971

(22) Filed: Sep. 14, 2009

(51) Int. Cl.
*G06F 15/16* (2006.01)

(52) U.S. Cl.
USPC ............. 709/217; 709/203; 709/224; 726/12; 726/22

(58) Field of Classification Search
USPC ............. 709/224, 225, 203, 217; 726/11–13, 726/22–25
See application file for complete search history.

(56) References Cited

U.S. PATENT DOCUMENTS

| | | | |
|---|---|---|---|
| 2002/0095607 A1* | 7/2002 | Lin-Hendel | 713/201 |
| 2005/0050222 A1* | 3/2005 | Packer | 709/238 |
| 2009/0070873 A1* | 3/2009 | McAfee et al. | 726/23 |
| 2009/0193126 A1* | 7/2009 | Agarwal et al. | 709/228 |
| 2009/0287653 A1* | 11/2009 | Bennett | 707/3 |

OTHER PUBLICATIONS

Web site http://www.google.com/gwt/n downloaded on Dec. 11, 2009.
Definition of Skweezer from Wikipedia®, a registered trademark of the Wikimedia Foundation, Inc. Downloaded from web site http://en.wikipedia.org/wiki/Skweezer on Dec. 9, 2009.
Web site http://www.skweezer.com/browse.aspx, © 2001-2009 Skweezer, downloaded on Dec. 11, 2009.
Web site http://www.baresite.com/index.php, (C) BareSite 2007-2009, downloaded on Dec. 11, 2009.
"About Mowser," © dotMobi 2007-2009. Downloaded from web site http://mowser.com/about on Dec. 9, 2009.
"Playing with Google Wireless Transcoder," SIRDARCKCAT Security and Programming Blog, Jul. 26, 2007. Downloaded from web site http://sirdarckcat.blogspot.com/2007/07/playing-with-google-wireless-transcoder.html on Dec. 9, 2009.
"Opting Out of Transcoding," published by Dennis Bournique on Aug. 27, 2008 in Content Adaptation. Downloaded from web site http://wapreview.com/blog/?p=918 on Dec. 9, 2009.
"Opera Turbo," copyright © 2009 Opera Software ASA. Downloaded from web site http://www.opera.com/business/solutions/turbo/ on Dec. 9, 2009.
"Lift Text Transcoder Administrator's Manual," Version 1.9 for RedHat Linux, © 2004-2005 UsableNet Inc. Downloaded from web site https://webtext.csun.edu/tt/admin-help.html on Dec. 2, 2009.

* cited by examiner

*Primary Examiner* — David Lazaro
(74) *Attorney, Agent, or Firm* — Wilmer Cutler Pickering Hale and Dorr LLP

(57) ABSTRACT

A method and apparatus for safe web browsing is disclosed. More specifically, the method and apparatus comprises receiving a webpage associated with a uniform resource locator (URL) access request. The webpage may further comprise a referenced link or script. A determination is made if any of the URL, the referenced link or script within the webpage are deemed unacceptable. The webpage is transcoded to block access to at least one of the URL, the referenced link or script deemed unacceptable. The transcoded webpage is sent to a computer that requested access to the URL.

18 Claims, 10 Drawing Sheets

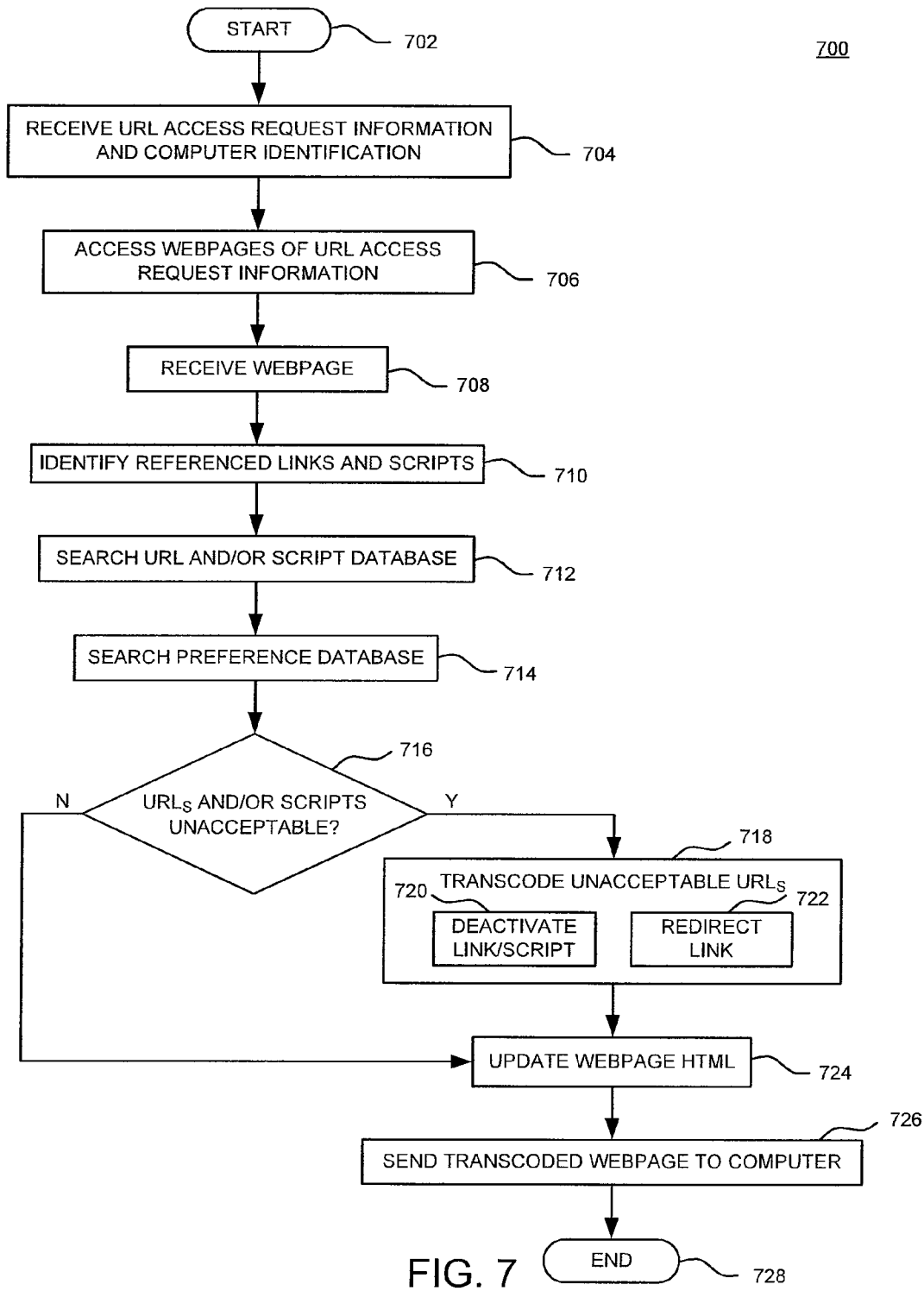

METHOD AND APPARATUS FOR SAFE WEB BROWSING

BACKGROUND

1. Field of the Invention

Embodiments of the present invention generally relate to computer security systems and, more particularly, to a method and apparatus for providing safe web browsing.

2. Description of the Related Art

With the development and progression of the Internet, people spend a significant amount of time accessing various websites on the Internet. People access various websites to communicate with others (e.g., through instant messages (IM), social networking and emails), conduct research (e.g., through educational websites, digital libraries and expert discussion forums), perform business related activities and the like. However, growth of the Internet has brought a proliferation of attacks by various malicious agents that use the Internet connectivity (e.g., viruses, Trojan horses, worms, spywares, phishing agents and/or the like) to harm user computing device(s) or compromise confidential user information. Typically, such agents attack the user computer, without the user's consent and/or knowledge, as an executable program, as an email attachment, as malicious Hypertext Markup Language (HTML) code on a web page, among other modes.

Conventionally, various anti-virus or security software packages are installed on a user's computing device to protect the device from illicit attacks. However, such software packages need to be configured appropriately, according to the usage, from time to time. Furthermore, such software packages routinely require updating for latest virus definitions (e.g., which may be required when a new strain of virus is detected). The configuration and updating of such software packages is usually cumbersome and/or complicated for an average user.

According to certain other approaches, Internet security is also provided through firewall solutions. However, such firewall solutions primarily block an entire website and associated domain name(s) that are deemed inappropriate or malicious. Configuration and updating of such firewall solutions are cumbersome and complicated, and, in most cases require substantial investment and/or maintenance cost for operations. Typically, firewall installation requires the assistance of an information technology specialist. Further, users have minimal flexibility in accessing a website that may be safe to browse, but has been blocked by a firewall solution. Accordingly, firewall solutions and the like are considered well suited mostly for enterprises that may be willing to provide appropriate support and maintenance.

Therefore, there is a need in the art for a method and apparatus for providing safe web browsing.

SUMMARY OF THE INVENTION

Embodiments of the present invention comprise a method and apparatus for providing safe web browsing. One embodiment is a computer-implemented method of safe web browsing, with at least a portion of the method being performed by a computing system comprising at least one processor within a transcoding server. The method receives a webpage associated with a uniform resource locator (URL), where the webpage comprises at least one of a referenced link or a script. The method determines which, if any, of the URL, the referenced link or the script are deemed unacceptable. The webpage is transcoded to block access to any of the URL the referenced link or the script deemed unacceptable. The transcoded webpage is sent to a computer that requested access to the webpage associated with the URL.

Another embodiment of the method includes receiving a URL access request containing the URL, where the URL access request is communicated from the computer to the transcoding server, and sending the URL access request to enable the transcoding server to receive the webpage.

Another embodiment of the method comprises identifying text of at least one of URL, the referenced link or the script and comparing the text to a database of URLs. If the text matches a URL in the database, the method decides whether the matching URL is unacceptable.

In another embodiment of the method, the transcoding comprises performing at least one of deactivating at least one of a link to the URL, the referenced link or the script deemed unacceptable or redirecting a link to the URL, the referenced link or the script deemed unacceptable to a safe webpage.

In another embodiment of the method, the transcoding further comprises updating HTML code of the webpage to cause the deactivating or redirecting.

In another embodiment of the method the determining step comprises: identifying text of at least one of the URL, the referenced link or the script. Then the method compares the text to a preferences database selected by a user. If the text matches information in the preferences database, the method decides whether the matching URL, referenced link or script is unacceptable.

In another embodiment of the invention, a computer-implemented method of safe web browsing, having at least a portion of the method being performed by a computing system comprising at least one processor, the method comprising generating a URL access request for a webpage and sending the URL access request to a network. The method also communicates information related to the URL access request to a transcoding server. The method then receives a transcoded webpage from the transcoding server corresponding to the webpage that has been processed to block access to links to unacceptable URLs or blocks execution of unacceptable scripts. The method displays the transcoded webpage.

In another embodiment of the method, the method further comprises establishing user preferences regarding which URLs, links or scripts are deemed unacceptable.

In another embodiment of the method, the method comprises communicating the URL access request to the transcoding server using a browser component.

In another embodiment of the method, the browser component is an add-on, extension or plug-in for a browser.

In another embodiment of the method, the method further comprises appending a tag to the URL access request.

In another embodiment of the method, the tag comprises information regarding routing the webpage associated with the URL access request to the transcoding server.

In another embodiment of the method, the tag further comprises information regarding the computer that requested access to the URL.

In another embodiment of the method, the method further comprises receiving, in response to sending the URL access request, the webpage associated with the requested URL and sending the webpage to the transcoding server for transcoding.

In another embodiment of the method, the method further comprises preventing the webpage from being displayed until the transcoded webpage is received from the transcoding server.

In another embodiment of the method, the method further comprises receiving and displaying the webpage with at least one of links or scripts deactivated and replacing the displayed webpage with the transcoded webpage when the transcoded webpage is received from the transcoding server.

Yet another embodiment of the invention is apparatus for providing safe web browsing, comprising a browser interface module for receiving a webpage associated with a uniform resource locator (URL), the webpage comprising at least one of a referenced link or script. The apparatus further comprises at least one database comprising information used in determining which, if any, of the URL, the referenced link or script are deemed unacceptable. The apparatus also comprises a transcoding module for transcoding the webpage to block access to any of the URL, the referenced link or script deemed unacceptable and for sending the transcoded webpage to a computer that requested access to the webpage associated with the URL.

In another embodiment of the method, the apparatus further comprises a customization module for customizing a procedure for determining which links or scripts are deemed unacceptable.

In yet another embodiment of the invention. apparatus for providing safe web browsing, comprising a computer for generating and communicating a Unified Resource Locator (URL) access request to a network, where the URL access request is associated with a webpage located at the URL and a transcoding server, coupled to the network, for receiving information regarding the URL access request, receiving the webpage associated with the URL, determining which, if any, of the URL, referenced links or scripts are deemed unacceptable, and transcoding the webpage to block access to any link or script deemed unacceptable

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 7 is a flow diagram of a method for transcoding a webpage using a transcoding server, according to one or more embodiments;

DETAILED DESCRIPTION

As explained in detail further below, various embodiments of the present disclosure enable safe web browsing on a computer requesting access to a webpage associated with a uniform resource locator (URL) request. All URL requests from a protected computer are communicated to a transcoding server to provide a safe web browsing experience for the protected computer. In some embodiments, the transcoding server is configured to transcode a webpage associated with each URL request to block access to the URL or one or more referenced URLs on the webpage (or webpages associated with the URL or one or more referenced URLs) deemed unacceptable. In another embodiment, the transcoding server blocks execution of scripts within the webpage that are deemed unacceptable. The unacceptability is arrived at based on databases and/or user settings that identify undesirable and/or malicious URLs and/or webpages. The transcoded webpage is sent to the computer that requested access to the webpage (i.e., the transcoded web page includes referenced links that are deactivated or redirected by the transcoding process). As a result, a safe browsing experience is established for the user.

Figure 1:
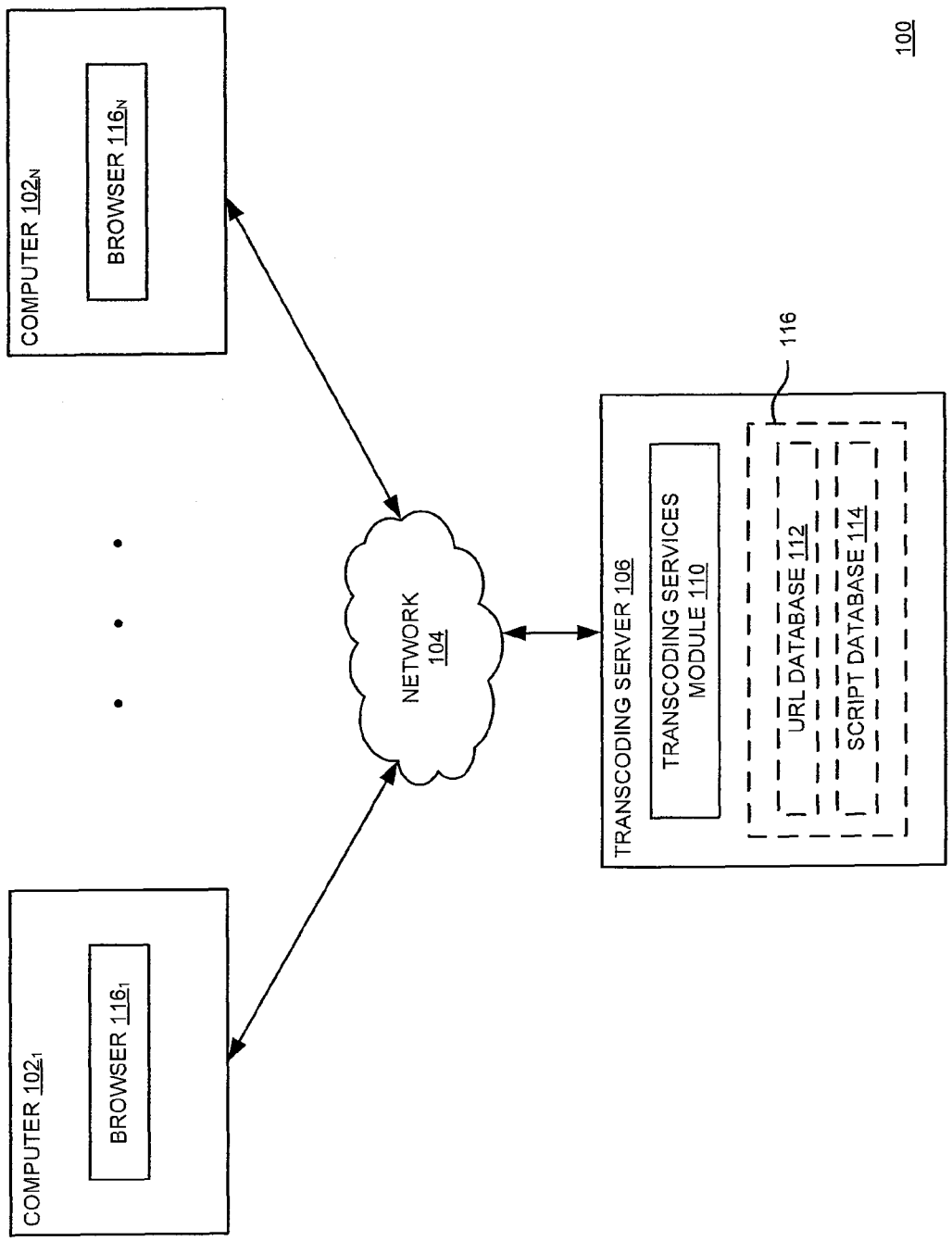
FIG. 1 is a block diagram of a system for safe web browsing, according to one or more embodiments.

FIG. 1 is a block diagram of a system 100 for safe web browsing according to one embodiment of the invention. The system 100 may form a computing environment that comprises a computer 102 (one or more of computers $102_1$ ... $102_N$) and a transcoding server 106, where each is coupled to one another through a data communications network 104.

Generally, the computer 102 is a type of computing device (e.g., a laptop, a desktop, a terminal, a Personal Digital Assistant (PDA), a mobile phone and/or the like) known to one of ordinary skill in the art having the benefit of this disclosure. The computer 102 includes various software packages, such as a browser 116 (browsers $116_1$ ... browsers $116_N$). According to one or more embodiments, the browser 116 accesses Internet resources (e.g., domain names, Uniform Resource Locators (URLs), and/or the like) and displays or renders contents associated with such Internet resources on the computer 102. The resources may further be identified through Uniform Resource Locator (URL) and/or may be a web page, image, video, or other piece of content. Non-limiting examples of the browser 116 include Windows Internet Explorer (IE), Mozilla Firefox, Apple Safari, Google Chrome, Opera, and/or the like generally known in the art.

The network 104 comprises a communication system that connects computers by wire, cable, fiber optic and/or wireless link facilitated by various types of well-known network elements, such as hubs, switches, routers, and the like. The network 104 may employ various well known protocols to communicate information amongst the network resources. For example, the network 104 may be a part of the Internet or Intranet using various communications infrastructure, such as Ethernet, WiFi, WiMax, General Packet Radio Service (GPRS), and the like.

Generally, the transcoding server 106 is a type of computing device such as a computer server programmed to perform transcoding services as described herein. In one embodiment, the computer server hardware is of a type known to one of ordinary skill in the art having the benefit of this disclosure. The transcoding server 106, generally, provides various services (e.g., application services including transcoding service, safe Internet browsing services and/or the like) to the computer 102, within the system 100. The transcoding server 106 includes a transcoding services module 110 and databases 116 including, for example, a URL database 112 and a script database 114. In an embodiment, the databases 116 may reside on the transcoding server 106. Alternatively, the databases 116 may be stored on a storage system (not shown) that is remote with respect to the transcoding server 106, communicably coupled through the network 104. The dashed block represents that the databases 116 may or may not be local to the transcoding server 106.

According to various embodiments, the URL database 112 maintains information associated with various websites, such as URL's (Uniform Resource Locator), domain name, reputation of the websites, and/or the like. In one embodiment, the URL database 112 may indicate reputation ratings (i.e., good or bad) for one or more websites, web pages or other web resources. According to one embodiment, the URL database 112 may include a blacklist and/or a whitelist. Similarly, the script database 114 comprises script text or signatures representing script text that is whitelisted, blacklisted or both.

According to various embodiments, the transcoding services module 110 receives a Uniform Resource Locator (URL) access request from users of the one or more computers (e.g., the computer 102). The transcoding services module 110 accesses a webpage associated with the URL and identifies one or more referenced links and/or scripts, if any, within the webpage.

The transcoding services module 110 accesses the databases 116 to determine which, if any, of the URL, the referenced links or scripts are deemed unacceptable (i.e., blacklisted URLs or scripts). The transcoding services module 110 transcodes the web page to block access to any URL deemed unacceptable i.e., the referenced URL may appear on the transcoded webpage; but the link to the unacceptable page is deactivated or redirected. The scripts found to be unacceptable, are transcoded to block them from being executable. The transcoding services module 110 provides the transcoded web page to the one or more computers, such as the computer 102 requesting access to the URL.

In an additional embodiment of the invention, the transcoding services module 110 may further transcode the referenced URLs (including acceptable, safe links) to ensure the user's browser accesses the transcoder server when selecting a referenced link (e.g., the browser is redirected to the transcoder server). As such, the protection of the computer 102 includes referenced web pages as well as the initially accessed web page. Thus, a user's safe web browsing experience continues throughout the browsing experience.

To utilize the safe web browsing provided by embodiments of the present invention, the browser 116 of each user computer 102 is configured to direct (map) webpage requests (URL access requests) to the transcoding server 106. In a manual mode embodiment, the user directs the browser 116 to a specific webpage supported by the transcoding server 106 (i.e., a portal to transcoding services) for a safe web browsing service. The safe web browsing service webpage provides a field in which to enter a URL of a web resource the user wishes to safely browse. Once the user enters the URL, a transcoded page of the requested resource appears in the user's browser window. In an automatic mode embodiment, the user's browser 116 automatically directs all URL requests to the transcoder server 106 such that all web resources are transcoded, as necessary, before being presented to the user.

Figure 2:
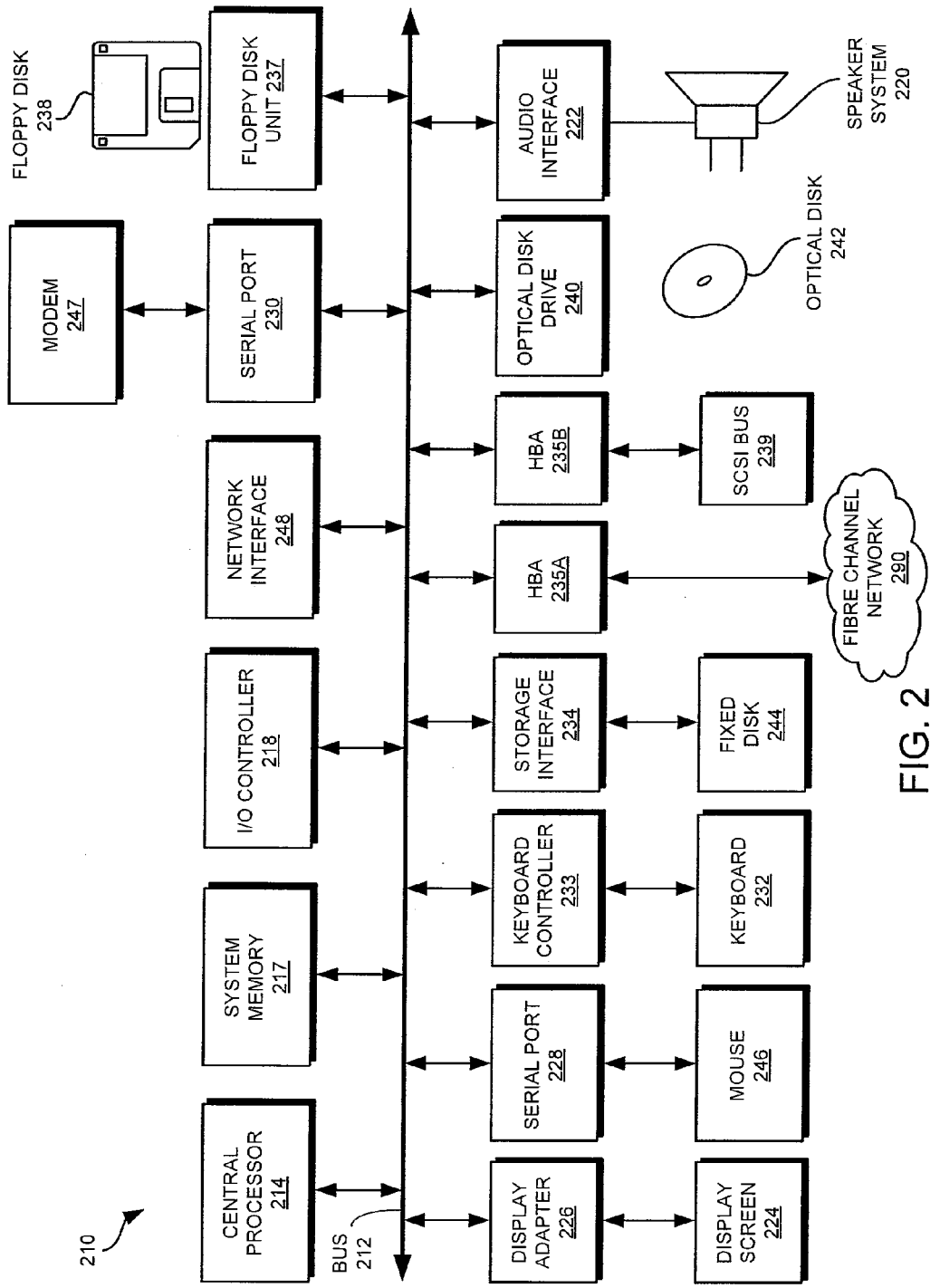
FIG. 2 is a block diagram of a suitable computer for implementing the present disclosure, according to one or more embodiments.

FIG. 2 is a block diagram of a computer system 210 suitable for implementing the present disclosure. This system 210 is representative of a computer system that can be used to implement the user computer 102 and/or the transcoding server 106 of FIG. 1. Computer system 210 includes a bus 212 which interconnects major subsystems of computer system 210, such as a central processor 214, a system memory 217 (typically RAM, but which may also include ROM, flash RAM, or the like), an input/output controller 218, an external audio device, such as a speaker system 220 via an audio output interface 222, an external device, such as a display screen 224 via display adapter 226, serial ports 228 and 230, a keyboard 232 (interfaced with a keyboard controller 233), a storage interface 234, a floppy disk drive 237 operative to receive a floppy disk 238, a host bus adapter (HBA) interface card 235A operative to connect with a Fiber Channel network 290, a host bus adapter (HBA) interface card 235B operative to connect to a SCSI bus 239, and an optical disk drive 240 operative to receive an optical disk 242. Also included are a mouse 246 (or other point-and-click device, coupled to bus 212 via serial port 228), a modem 247 (coupled to bus 212 via serial port 230), and a network interface 248 (coupled directly to bus 212).

Bus 212 allows data communication between central processor 214 and system memory 217, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral devices. Applications resident with computer system 210 are generally stored on and accessed via a computer readable medium, such as a hard disk drive (e.g., fixed disk 244), an optical drive (e.g., optical drive 240), a floppy disk unit 237, or other storage medium. Additionally, applications can be in the form of electronic signals modulated in accordance with the application and data communication technology when accessed via network modem 247 or interface 248.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an Internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. The operation of a computer system such as that shown in FIG. 2 is readily known in the art and is not discussed in detail in this application. Code to implement the present disclosure can be stored in computer-readable storage media such as one or more of system memory 217, fixed disk 244, optical disk 242, or floppy disk 238. The operating system provided on computer system 210 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 3:
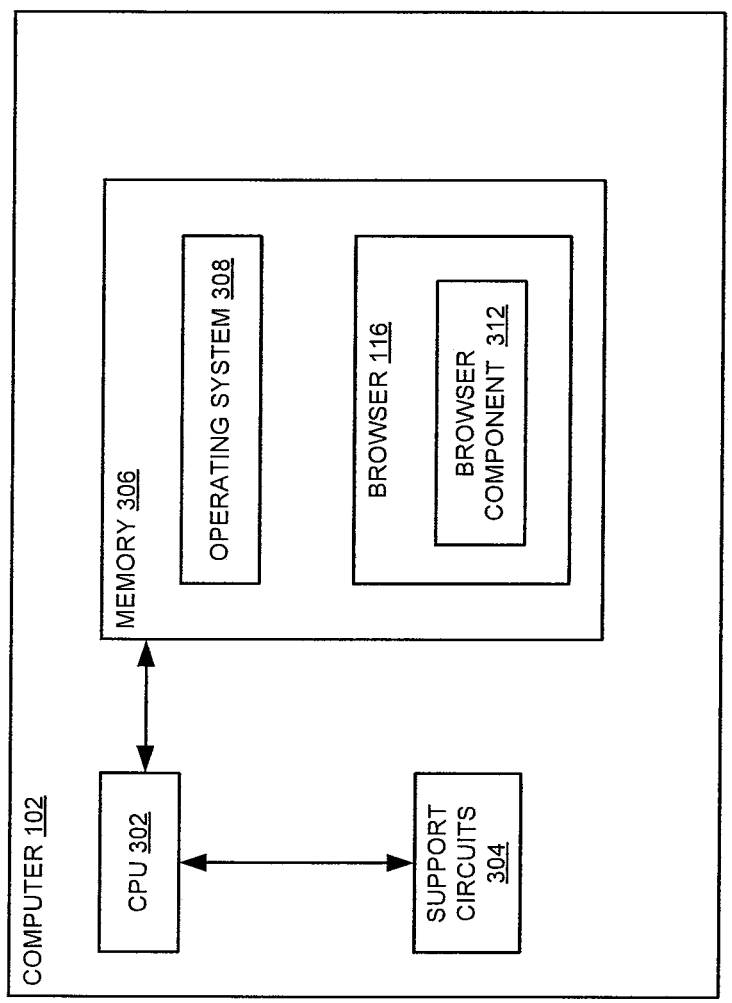
FIG. 3 is a block diagram of a computer that is provided with a safe web browsing environment in accordance with one or more embodiments of the invention.

FIG. 3 is a block diagram of a computer 102 for safe web browsing according to one embodiment.

The computer 102 is a type of computing device (e.g., a laptop, a desktop, a terminal, a netbook, a mobile device, Personal Digital Assistant (PDA) and/or the like) that comprises a Central Processing Unit (CPU) 302, various support circuits 304 and a memory 306. The CPU 302 may comprise one or more commercially available microprocessors or microcontrollers that facilitate data processing and storage. Various support circuits 304 facilitate operation of the CPU 302 and may include clock circuits, buses, power supplies, input/output circuits and/or the like. The memory 306 includes a read only memory, random access memory, disk drive storage, optical storage, removable storage, and the like. The memory 306 includes various software packages, such as an operating system 308, and a browser 116 among others.

The operating system 308 generally manages various computer resources (e.g., network resources, data storage resources, file system resources and/or the like). The operating system 308 is configured to execute operations on one or more hardware and/or software devices, such as Network Interface Cards (NICs), hard disks, virtualization layers, firewalls and/or the like. For example, the various software packages call commands associated with the operating system 308 (i.e., native operating system commands) to perform various file system and/or storage operations, such as creating files or metadata, writing data to the files, reading data from the files, modifying metadata associated with the files and/or the like. The operating system 308 may call one or more functions associated with the browser 116 to execute various web browsing operations.

According to one or more embodiments, the browser 116 includes a software application for accessing Internet resources (e.g., domain names, Uniform Resource Locators (URLs), and/or the like) and displays contents associated with the Internet resources on the computer 102. The resources may further be identified through Uniform Resource Identifier (URI) and/or may be a web page, image, video, or other piece of content. The browser 116 may include, but are not limited to, Windows Internet Explorer (IE), Mozilla Firefox, Apple Safari, Google Chrome, Opera, Internet Explorer Mobile (IE), jB5, WebOS, Opera Mobile, and/or the like. The browser 116 further includes a browser component 312 configured to provide additional functionalities for the browser (e.g., an add-on, plug-in or extension that facilitates the use of safe web browsing in accordance with one or more embodiments of the invention.

According to an embodiment, the browser component 312 is configured to capture access requests for these Internet resources (e.g., domain names, Uniform Resource Locators (URLs) and/or the like) made on the computer 102, and send such information regarding such requests to a transcoding server, for example the transcoding server 106 of FIG. 1. According to an embodiment, the browser component 312 may be implemented as a toolbar, and requests for Internet resources are accessed through the toolbar instead of an address bar of the browser.

In a manual mode embodiment, the browser component 312 is configured to send the URL request to the transcoding server 106, then receive and display the transcoded webpage associated with the requested URL. The transcoded webpage is a version of the requested webpage that does not contain links to unacceptable web pages or other Internet resources.

In an automatic mode embodiment, the browser component 312 is configured to capture access requests for Internet resources (e.g., domain names, Uniform Resource Locators (URLs) and/or the like) made on the computer 102, and automatically modify such access requests such that information regarding all URL requests is sent to the transcoding server 106. The transcoding server 106, as described below, requests the web page related to the requested URL, transcodes the web page and sends the transcoded web page to the computer 102. In this manner, the user operates the browser 116 in a standard manner, while the browser component 312 automatically captures and redirects the URL access requests to seamlessly provide a safe browsing experience to the user.

Figure 4:
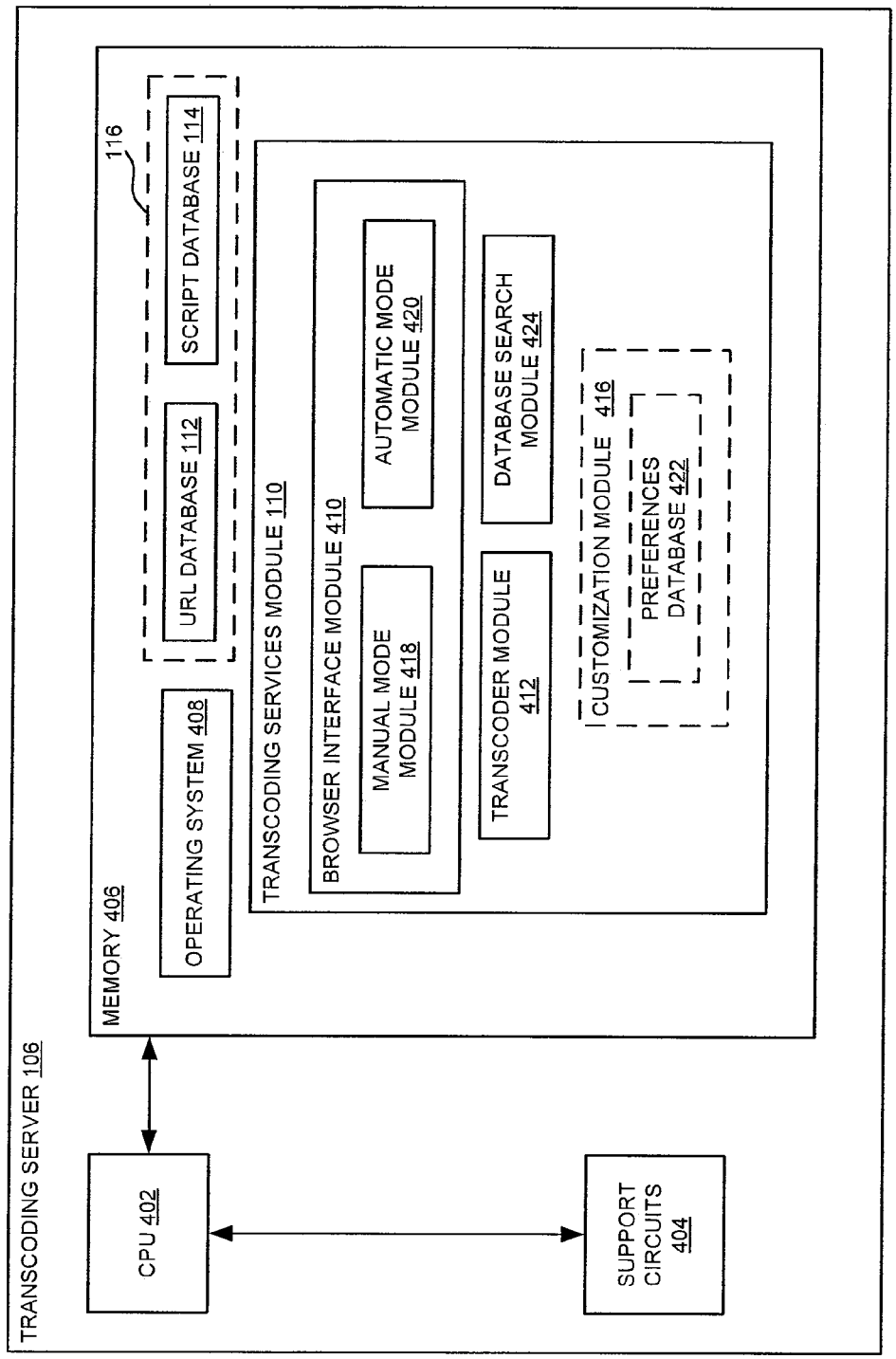
FIG. 4 is a block diagram of a transcoding server for enabling safe web browsing for the computer according to one or more embodiments.

FIG. 4 is a block diagram of a transcoding server 106 for providing safe web browsing according to one or more embodiments. The transcoding server 106 is a type of computing device (e.g., computer server) that comprises a Central Processing Unit (CPU) 402, various support circuits 404 and a memory 406. The CPU 402 may comprise one or more commercially available microprocessors or microcontrollers that facilitate data processing and storage. Various support circuits 404 facilitate operation of the CPU 402 and may include clock circuits, buses, power supplies, input/output circuits and/or the like. The memory 406 includes a Read Only Memory, Random Access Memory, disk drive storage, optical storage, removable storage, and the like. The memory 406 includes various data and software packages, such as an operating system 408, databases 116 and a transcoding services module 110 including a browser interface module 410, a transcoder module 412, a database search module 424, and an optional a customization module 416.

The operating system 408 generally manages various computer resources (e.g., network resources, data storage resources, file system resources and/or the like). The operating system 408 is configured to execute operations on one or more hardware and/or software devices, such as Network Interface Cards (NICs), hard disks, virtualization layers, firewalls and/or the like. For example, the various software packages call commands associated with the operating system 408 (i.e., native operating system commands) to perform various file system and/or storage operations, such as creating files or metadata, writing data to the files, reading data from the files, modifying metadata associated with the files and/or the like. The operating system 408 may call one or more functions associated with the transcoding services module 110 and databases 116 to execute various web related operations.

According to various embodiments, the transcoding services module 110 provides transcoding of web pages to ensure the web pages are safe when delivered to a user computer. The transcoding services module comprises a browser interface module 410, a transcoder module 412, a database search module 424 and an optional customization module 416.

The browser interface module 410 acts as an interface between a browser (i.e. the browser 116 of FIG. 1) and the transcoder module 412. The browser interface module 410 may be a Graphical User Interface (GUI), a Command Line Interface (CLI) and/or other user interface that facilitates communication between the browser and the transcoder module 412. According to an embodiment, the browser interface module 410 monitors various user activities and renders such activities to the transcoder module 412. The browser interface module 410 utilizes a manual mode module 418 and an automatic mode module 420 to provide two different safe web browsing experiences to the user. According to some embodiments, the user activities may include identifying various Internet resources such as (e.g., domain names, Uniform Resource Locators (URLs) and/or the like). For example, the user may utilize the browser to access a website, for example www.uspto.gov, the browser interface module 410 monitors such activity initiated by the user, accesses the requested webpage and communicates the webpage to the transcoder module 412 for further processing and analysis as described further below.

According to various embodiments, the URL database 112 maintains information associated with various websites, such as URL's (Uniform Resource Locator), domain name, reputation of the websites, and/or the like. In one or more embodiments, the URL database 112 is a pre-populated database that is updated as web pages change and/or are added or deleted to/from the Internet. In one embodiment, the URL database 112 may be populated with information through various ways, such as conducted surveys, information collected by experts over a period of time, using a web crawler, other reporting techniques and/or the like.

In one embodiment, the URL database 112 may utilize reputation ratings (i.e., good or bad) for one or more websites. Hence, a website associated with a good reputation is most likely safe to browse. On the other hand, a website associated with a bad reputation is most likely unsafe. Such a website most likely contributes to proliferation of malicious threats. According to one embodiment, the URL database 112 may include a blacklist and/or a whitelist of URLs, where the blacklist (i.e., "bad sites") indicates the one or more websites that are not safe to access and the whitelist (i.e., "good sites") indicates the one or more websites that are safe to access. Generally, as implemented in one specific embodiment of the invention, the URL database 112 will contain a blacklist, and all web pages not on the blacklist are considered good.

In another embodiment, the databases 116 include a script database 114. The script database 114 comprises searchable text of scripts or signature representations of scripts. The scripts may be whitelist ("good" or "safe") scripts, blacklist ("bad" or "malicious") scripts or both. The script database 114 is used to identify scripts that are not to be executed because they may result in malicious or other undesirable activity.

According to various embodiments, the browser interface module 410 receives a Uniform Resource Locator (URL) access request from users of the one or more computers (e.g., the computer 102). The browser interface module 410 accesses a webpage associated with the URL. The transcoder module 412 identifies one or more referenced links (or web links and/or scripts), if any, within the webpage. The database search module 424 compares the URL and the referenced links to the URL database to identify unacceptable URLs. The database search module 424 may also compare the text of any scripts to the script database 114. In an embodiment, the transcoder module 412 may block a full and/or a portion of requested web links or referenced URLs on the basis of information received from the URL database 414, i.e., access to referenced URLs deemed unacceptable is blocked. In another embodiment, the transcoder module 412 may allow a full and/or a portion of requested referenced URLs on the basis of information received from the URL database 414, i.e., access to referenced URLs not deemed unacceptable (or deemed acceptable) is allowed. Additionally, any unacceptable scripts may be blocked from being executable.

The transcoder module 412 utilizes the database search module 424 to access the URL database 112 to determine which, if any, of the URL or one or more of the referenced links are deemed unacceptable (e.g., blacklisted URLs). The transcoder module 412 transcodes the webpage to deactivate links to any URL deemed unacceptable (i.e. blacklisted URLs). The transcoder module 412 provides the transcoded webpage to the one or more computers (i.e., the computer 102) that requested access to the URL. During transcoding, the deactivated link or script may be replaced with a message stating the link was deemed unacceptable or some other indicia may be displayed (e.g., a color of the link, link field or script region). Alternatively or in addition, the link or script may be replaced with a link that redirects the user's browser to a webpage having a "blocked page" message or some other "safe" webpage.

According to an embodiment, if on a webpage, one or more URL's are found to be bad/malicious URL's, the transcoder module 412 deactivates (or blocks access to) only the bad/malicious URL's, while links to other, non-bad/malicious resource links remain active and are rendered to the user on the computer 102 without alteration. Similarly, some scripts may be rendered non-executable while others remain executable.

According to various embodiments, the optional customization module 416 is utilized for customizing the experience of the user. For example, a user (e.g., a parent) could identify certain Internet resources (e.g., domain names, Uniform Resource Locators (URLs), scripts and/or the like) that are appropriate for their child that might otherwise be on the blacklist on the URL database 414, i.e., the user may override a block access decision. In other embodiments, the user may block access to certain Internet resources that may be otherwise on a whitelist, but are identified as undesirable by the user. Accordingly, the user may configure or customize the settings of the transcoder module 412 for allowing and/or blocking access to such Internet resources. These user preferences are stored in preferences database 422. The customization module 416 stores a computer identifier (this may include the use of a cookie stored on the computer 102 of FIG. 1 to facilitate user identification) in association with the user preference (e.g., URL's to be blocked or allowed). The transcoder module 412 uses both the database 116 and the customization module 416 to perform transcoding.

Figure 5:
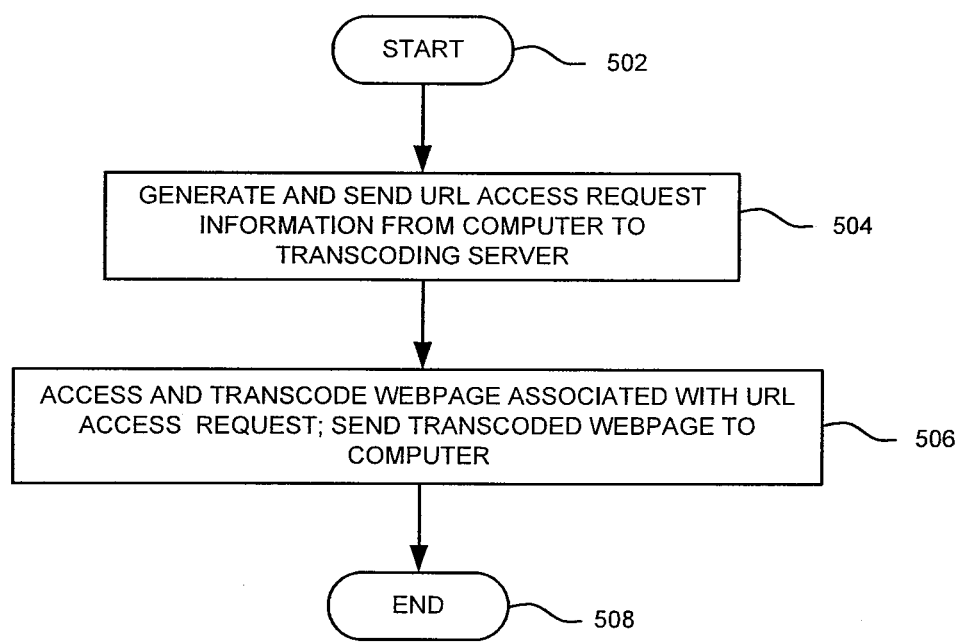
FIG. 5 illustrates a high level flow diagram of a method for providing safe web browsing, according to one or more embodiments.

FIG. 5 illustrates a high-level flow diagram of a method utilized by the computer system 100 to provide a safe web browsing capability to the computer 102 according to one embodiment of the invention.

The method 500 starts at step 502 and proceeds to step 504. At step 504, a Uniform Resource Locator (URL) access request information generated at a computer (e.g., the computer 102 of FIG. 1) is sent to a transcoding server (e.g., the transcoding server 106 of FIG. 1. The URL access request information may be the URL request itself or the information may contain the URL of the desired webpage extracted from the actual URL access request. In an embodiment, the URL request information is sent to the transcoding server by requesting access to the URL via a transcoding server webpage. In another embodiment, the URL request may be initialized through a browser component of a browser on the computer. Additional details regarding the operation of browser component to facilitate creation and communication of the URL access request are described below with respect to FIGS. 6A and 6B.

At step 506, the transcoding server accesses and transcodes the webpage specified by the URL request sent from the computer and sends the transcoded webpage to the computer 102. Details of the transcoding process are described below with respect to FIG. 7. The method 500 proceeds to and ends at step 508.

Figure 6A:
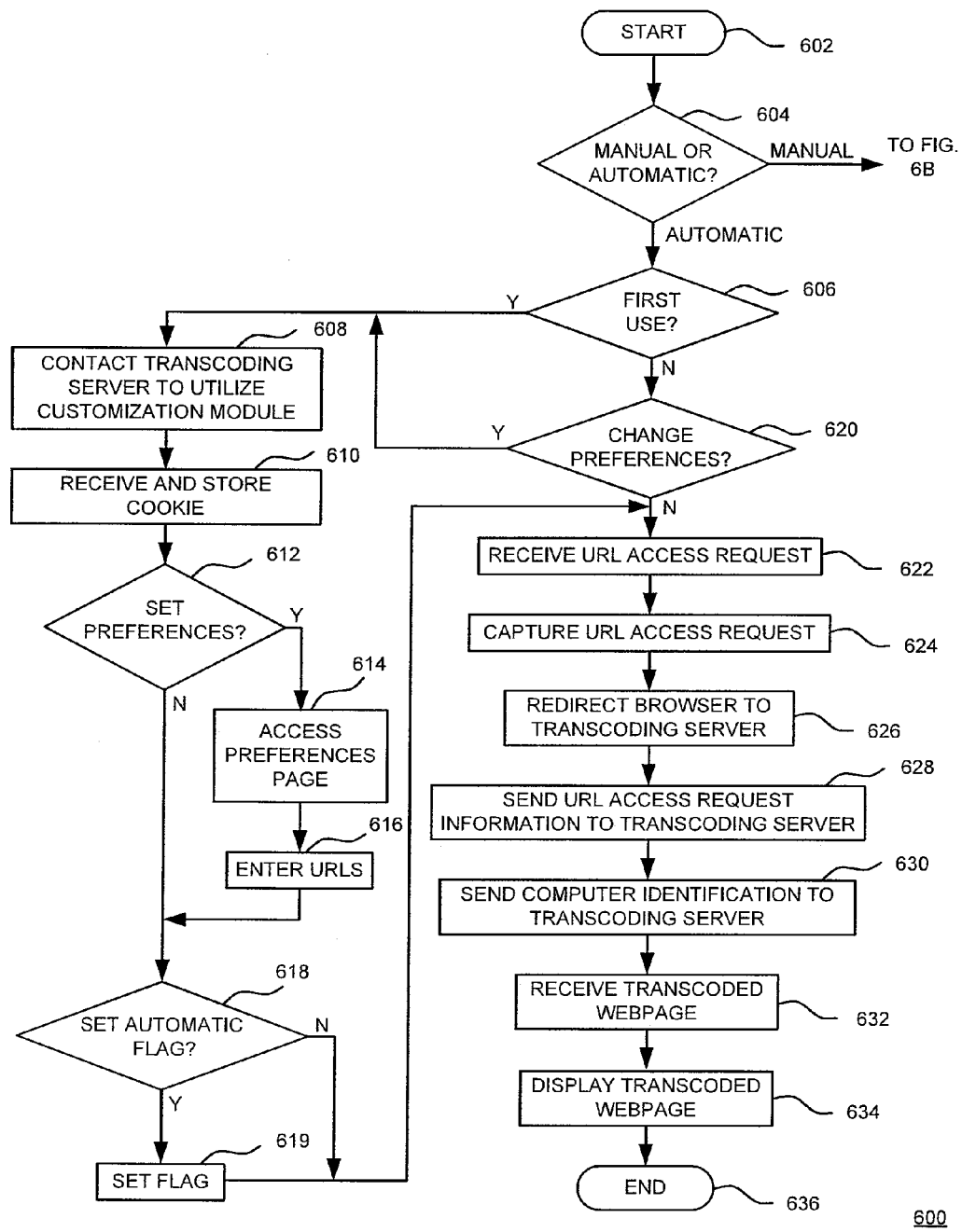
FIGS. 6A and 6B together form a flow diagram of a method of operation of the computer when utilizing services provided by the transcoding server in accordance with an embodiment of the invention.
Figure 6B:
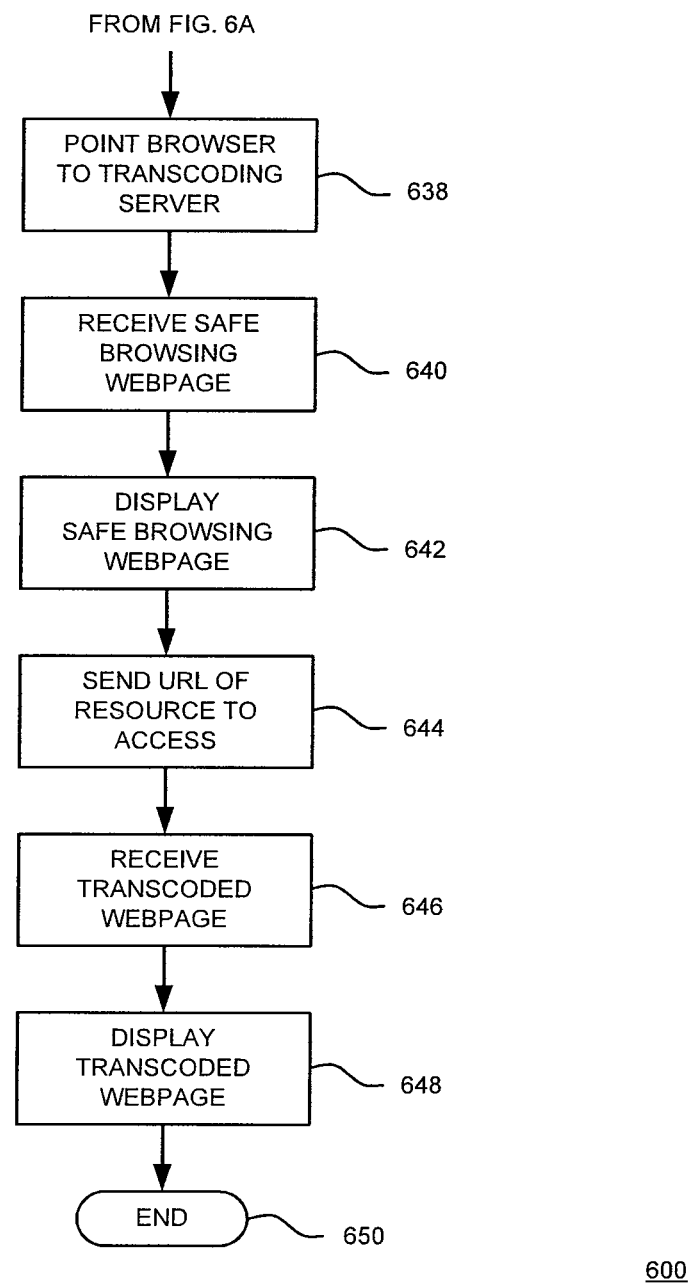

FIGS. 6A and 6B together depict a flow diagram of a method 600 of operation for the browser 116 operating in conjunction with the browser component 312 in accordance with one or more embodiments of the invention.

FIG. 6A begins at step 602 and proceeds to step 604, where the method 600 queries whether an automatic mode or a manual mode is to be used. As shall be described below, the automatic mode can be selected as a user preference so that the method 600 will automatically progress through step 604 to the remainder of the automatic mode process. If manual mode is selected, the method 600 progresses to the steps of FIG. 6B described below.

In the automatic mode, the method 600 proceeds to step 606, where the method 600 queries whether the method is being used for the first time. If the method is being used for the first time, the method proceeds to step 608. This path enables the user to access and use the customization module 416 (FIG. 4). These steps are optional. The user is not required to establish preferences. However, doing so enhances the safe web browsing experience through automated access to the transcoding server and blocking/enabling of user selected Internet resources.

At step 608, the transcoding server is contacted to enable the browser component, through the browser, to access and utilize the customization module. At step 610, the browser receives and stores a cookie. The use of a cookie enables the transcoder server to identify the user computer and utilize the preference settings. Other computer identification techniques could be used.

At step 612, the method 600 queries the user whether preferences are to be established. If the query is affirmatively answered, the method 600 proceeds to step 614 where the browser component accesses and displays a preferences entry web page as supplied by the transcoder server. At step 616, the user enters white and/or black list URLs. Additionally, the user may enter white and/or blacklist scripts or script identifiers (e.g., signatures). These URLs are stored in the preferences database 422 of FIG. 4.

If the user decided not to set preferences at step 612 or the preferences have been set, the method 600 proceeds to step 618. At step 618, the method 600 queries whether the user desires to automatically enter automatic mode upon future web browsing. If so, the method sets a flag in the browser component such that all future browsing (i.e., every entered URL access request) will be directed to and processed by the transcoding server. If the user does not desire automated instantiation of the automatic mode or after setting the automatic mode flag, the method proceeds from step 618 to step 622.

If this is not the first use of the browser component, the method 600 proceeds from step 606 to step 620 where the method 600 queries whether the user desires to change any preferences. Rather than an active query, this query may be a selectable pull down menu item or other optional path to step 608 and a session of interaction with the customization module. If the user does not wish to change preferences, the method 600 proceeds to step 622.

At step 622, the method receives a URL address through a user entering the URL into the browser or into a toolbar supported by the browser component. If the user had previously selected to use automatic mode and had not selected to change preferences, the method 600 would proceed directly to step 622 upon the user entering a URL into the browser.

At step 624, the URL access request is captured to ensure that the browser does not access the resource identified by the URL. The captured URL access request is replaced with a URL directing the browser to the transcoding server. At step 626, the browser is redirected to the transcoding server. For security or to ensure the user has a paid account, a login procedure may occur at this point in the method 600. Such procedures are well known in the art; thus, not specifically depicted.

Once the transcoding server is accessed, at step 628, the method 600 sends the URL from the captured URL access request to the transcoding server. In addition or subsequently, at step 630, the computer identification (if available) is sent to the transcoding server. The computer identification may be sent in response to the transcoding server searching for a cookie, or the identification information may be sent from the browser component.

In response to receiving the URL, the transcoding server performs a transcoding procedure as described below with respect to FIG. 7. Upon completing the transcoding procedure, the transcoding server sends a transcoded webpage to the browser. At step 632, the method receives the transcoded webpage and at step 634, the transcoded webpage is displayed within the browser in a conventional manner. The method ends at step 636.

FIG. 6B depicts a flow diagram of a manual method of safe web browsing in accordance with another embodiment of the invention. FIG. 6B begins at step 638 when a user selects to utilize the manual mode within the query of step 604 in FIG. 6A.

At step 638, the user enters the URL of the transcoding server. The method 600 points the browser at the transcoding server. At step 640, the transcoding server webpage is received and, at step 642, the webpage is displayed. Generally, the webpage is the "home page" for receiving transcoding services from the transcoding server. A conventional login procedure may be initiated at this point.

At step 644, the user enters a URL into a field on the webpage and the method 600 sends the entered URL to the transcoding server. The transcoding server accesses the webpage at the requested URL, performs transcoding as described below, and sends the transcoded webpage to the browser. At step 646, the method receives the transcoded webpage and, at step 648, displays the transcoded webpage within the browser in a conventional manner. The method ends at step 650.

The foregoing describes various embodiments of a method used by a user computer to provide safe web browsing to a user in either an automatic mode or a manual mode. In other embodiments of the invention, various ones of the individual steps may be combined into single steps or divided into substeps, or the steps may be performed in variations of the presented order.

FIG. 7 is a flow diagram of a method 700 for transcoding a webpage at the transcoding server to provide safe web browsing for the computer, according to one or more embodiments of the invention. This method is instantiated when software code of the transcoding services module 110 of FIG. 4 is executed by the CPU 402 of the transcoding server 106

The method 700 starts at step 702 and proceeds to step 704. At step 704, the method 700 receives a URL access request information and computer identification information (if any) from the browser component. The URL may be provided by the browser component via either the automatic mode or the manual mode.

At step 706, the method 700 accesses the webpage associated with the requested URL. In one embodiment, a webpage access request is sent from the transcoding server through the network to a server supporting the requested webpage. At step 708, the webpage associated with the requested URL is received by the transcoding server.

At step 710, the method 700 scans the webpage to identify one or more referenced links within the webpage. In one embodiment, the method 700 searches the text of the hypertext markup language (HTML) code (including XHTML, DHTML and the like) for specific text strings identifying referenced. In an alternative embodiment, the method 700 searches for script text within the HTML code, e.g., Javascript, ASP, JSP, PHP, Perl, Tcl, Python and the like.

At step 712, the identified URL text of the referenced URLs as well as the URL text of the requested webpage itself are compared to the URLs listed in the URL database (database 114). The script text, if any, may be similarly searched. In one embodiment, the script text is hashed to form a signature; then the search of signatures within the database 114 is performed. Next, at step 714, the same URLs and scripts are compared to the preference database (database 422 of FIG. 4) to determine if a blacklist URL or script has been overridden by a user preference, or if an acceptable URL is deemed unacceptable by a user preference. The specific preferences are identified in the database using the computer identification information received at step 704. In some embodiments of the invention, step 714 might be skipped when operating in, for example, the manual mode and/or where a user may not have established preferences. In one embodiment, if the computer identification information is not received in step 704, step 714 is skipped. At step 716, the method 700 queries whether the URLs and/or scripts contain any that are deemed unacceptable.

If any of the URLs are deemed unacceptable, the method 700 proceeds to step 718. At step 718, the URLs are transcoded to block access to the webpage associated with the unacceptable URL and/or script. The nature of the block may vary depending on system implementation. In one embodiment, step 720 is executed to deactivate the link to the URL or deactivate execution of a script. Alternatively, at step 722, the link and/or script is transcoded into a link to a "safe" webpage containing a warning message or other information. Various URLs can have different transcoding performed such that some links are deactivated and others are redirected. In addition, the link itself within the webpage may be altered or the field around the link may be altered to identify a blocked link by unique colors or other indicia of URL unacceptability. Scripts can be similarly marked.

At step 724, the webpage HTML code (including XHTML, DHTML and the like) is updated with the link modifications. Note, if the requested webpage itself is unacceptable, the transcoding process sends a replacement page notifying the user of the unacceptability of the content on the page. The replacement page is provided through a redirected connection to the "safe" webpage.

Step 724 may additionally alter all the referenced URLs to direct the link(s) to the transcoding server such that selecting the link automatically cause the linked page to be processed by the transcoding server before display to the user. This feature is especially useful when the user is operating in the automatic mode, i.e., selecting a referenced link without this recoding would allow access to the referenced page without processing by the transcoding server.

Once the webpage HTML is updated or the requested webpage is found to have no unacceptable referenced URLs, the method proceeds to step 726 where the transcoded webpage or the clean webpage is sent to the computer. The method 700 proceeds to step 728, at which the method 700 ends.

Figure 8:
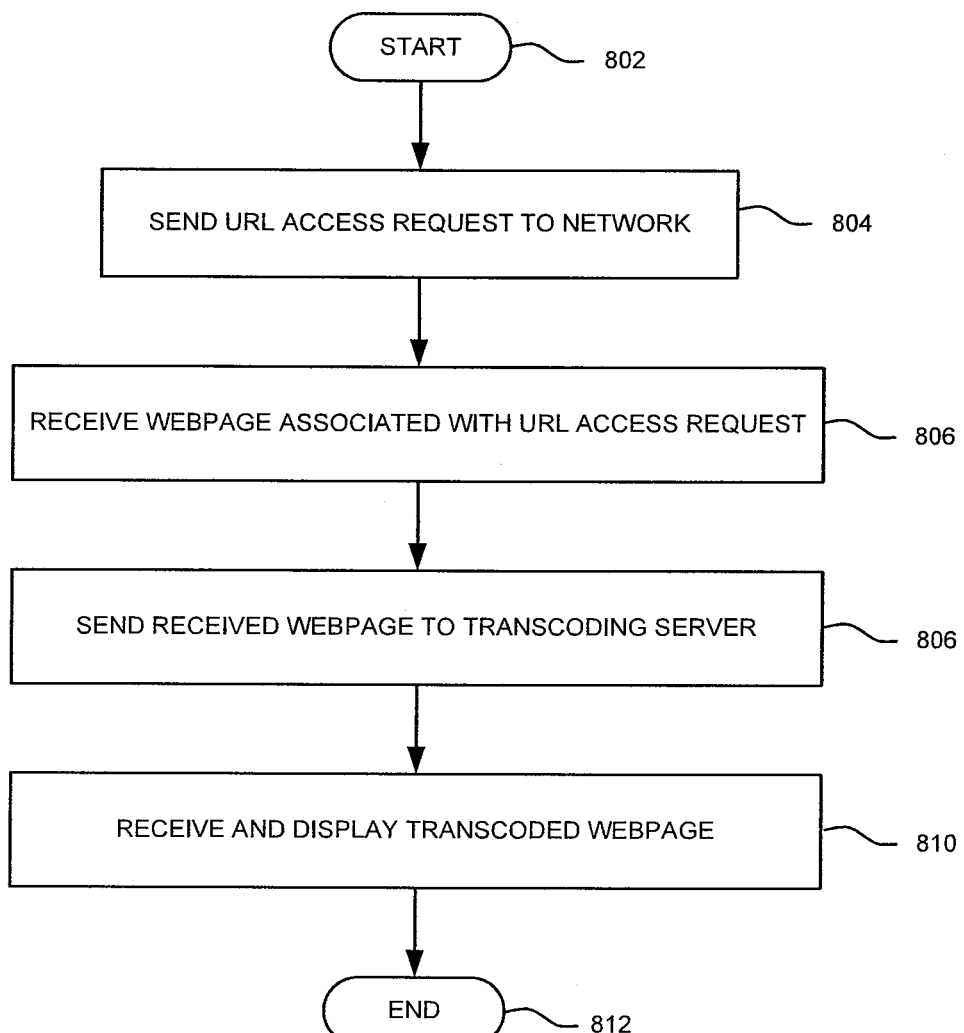
FIG. 8 depicts a flow diagram of an alternative embodiment of the present invention of a method of operation of the computer when utilizing services provided by the transcoding server.

FIG. 8 illustrates a flow diagram of a method 800 utilized by a computer for safe web browsing, according to another embodiment of the invention. In this embodiment, the computer 102 sends a URL access request to the network in a standard manner. When the HTML is received for the webpage at the computer, the browser component blocks display of the webpage entirely or displays the webpage, but deactivates all the links therein. While the page is being displayed or not, the webpage or a link to the webpage is forwarded to the transcoding server 106. The transcoding server 106 transcodes the webpage as described above with respect to FIG. 7 and sends the transcoded webpage to the computer to replace the previously displayed page.

More specifically, the method 800 starts at step 802 and proceeds to step 804. At step 804, a uniform resource locator (URL) access request is entered into a browser by the user and sent to the network (e.g. network 104) by the computer in a conventional manner. In one embodiment, users of the computer send a URL request to the network 104 by requesting access through a browser. In another embodiment, the URL request is initialized by a browser component 312 of the browser 116, e.g., via a toolbar.

At step 806, a webpage associated with the URL access request is received at the computer. In an embodiment, the webpage is prevented from being displayed and/or rendered on the computer. In another embodiment, all links in the webpage are deactivated and the webpage is displayed.

At step 808, the webpage is sent to the transcoding server (e.g., the transcoding server 106 of FIG. 1) for transcoding as described above with respect to FIG. 7. Alternatively, a link to the webpage (e.g., the URL) is sent by the computer (e.g., using the browser component) to the transcoding server and the transcoding server accesses the webpage, and then the server performs the transcoding. In the latter embodiment, the link may be sent at the same time the computer initially sends a request to the network for the webpage.

At step 810, the computer receives the transcoded webpage from the transcoding server. The transcoded webpage is displayed within the browser. If the webpage was initially displayed with blocked links, the initial webpage is replaced with the transcoded webpage.

The method 800 proceeds to step 812, where the method 800 ends.

The embodiment of FIG. 8 facilitates displaying the webpage while the transcoding server processes the webpage to identify unacceptable links. This embodiment may find use in certain bandwidth limited networking situations.

Figure 9:
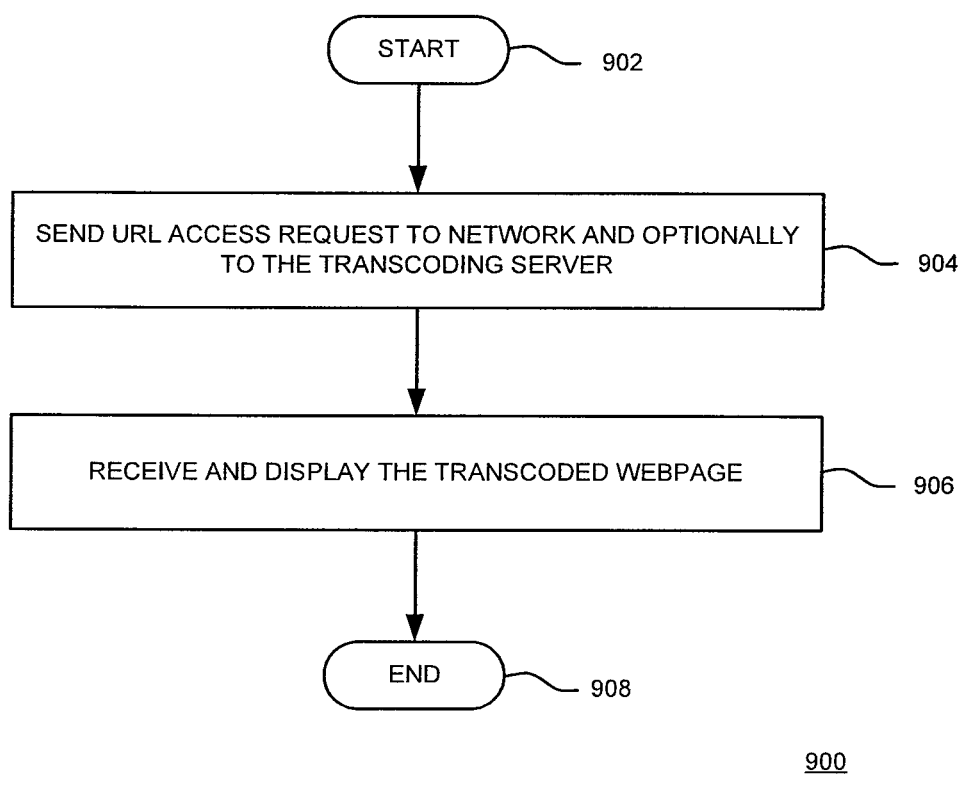
FIG. 9 depicts a flow diagram of another alternative embodiment of the present invention of a method of operation of the computer when utilizing services provided by the transcoding server.

FIG. 9 illustrates a flow diagram of a method 900 for providing a safe web browsing experience to a computer in accordance with yet another embodiment of the invention. In this embodiment, the computer sends a URL access request to the network. The URL access request is formatted to cause the webpage to be sent to the transcoding server and not to the computer. The transcoding server receives the webpage, transcodes the webpage and sends the transcoded webpage to the computer for display. To ensure proper routing of the transcoded webpage, the computer sends the URL access request and computer identification information to the transcoding server at the time the URL access request is made. In this manner, the transcoding server understands where to route the transcoded webpage when transcoding is complete.

More specifically, the method 900 (implemented in the computer as part of the browser component) starts at step 902 and proceeds to step 904. At step 904, the computer generates and sends a uniform resource locator (URL) access request for an associated webpage to a network (e.g., network 104) by a computer. In an embodiment, the URL access request may be initialized through a browser component 312, e.g., via a tool bar. The URL access request is formatted to have the webpage delivered (redirected) to the transcoding server, e.g., delivery and source tags are appended by the browser component to identify the requestor and the location to deliver the webpage. Such redirection of traffic can be implemented using, for example, a firewall. In another embodiment, the URL access request is simultaneously sent to the transcoding server. In this manner, the transcoding server is informed regarding the imminent delivery of the webpage and to what location the transcoded webpage is to be sent.

The webpage is received by the transcoding server and processed in the same manner as described above with respect to FIG. 7. After transcoding is complete, the transcoding server sends the transcoded webpage to the computer. At step 906, the computer receives the transcoded webpage and displays the webpage within the browser window. The method 900 proceeds to step 908, where the method 900 ends.

In the embodiment of FIG. 9, the computer is provided the ability to perform safe web browsing without undue burden on the computer or its user. A browser plug-in, add-on extension or the like is used as a browser component that facilitates formatting the URL access request to route the webpage to the transcoding server. The transcoding server undertakes all processing as well as set up and configuration burdens for the safe web browsing experience.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

The invention claimed is:

1. A computer-implemented method of safe web browsing, at least a portion of the method being performed by a computing system comprising at least one processor within a transcoding server, the method comprising:

receiving a webpage associated with a uniform resource locator (URL), the webpage comprising at least one of a referenced link or a script;
displaying the webpage with at least one of links or scripts deactivated;
determining if any of the URL, the referenced link, or the script are deemed unacceptable, wherein determining if any of the URL, the referenced link, or the script are deemed unacceptable comprises:
identifying at least a portion of at least one of the URL, the referenced link, or the script;
comparing the identified at least a portion to a database comprising information representative of web resources identified as unsafe and information representative of user preferences identified by a user, the user being associated with a user device that requested access to the webpage associated with the URL; and
if the identified at least a portion matches information in the database, deciding whether the matching URL, referenced link, or script is unacceptable;
transcoding the webpage to block access to content associated with any of the URL, the referenced link, or the script that are deemed unacceptable;
sending the transcoded webpage to the user device; and
replacing the displayed webpage with the transcoded webpage.

2. The method of claim 1 further comprising receiving a URL access request containing the URL, where the URL access request is communicated from the user device to the transcoding server, and sending the URL access request to enable the transcoding server to receive the webpage.

3. The method of claim 1 wherein transcoding comprises performing at least one of: (a) deactivating at least one of a link to the URL, the referenced link, or the script; (b) redirecting at least one of a link to the URL, the referenced link, or the script to a safe webpage; and (c) redirecting the referenced link to access the transcoding server when the referenced link is selected.

4. The method of claim 3 wherein transcoding further comprises updating HTML code of the webpage to cause the deactivating or redirecting.

5. The method of claim 1 wherein the information representative of user preferences comprises URLs selected by the user.

6. A computer-implemented method of safe web browsing, at least a portion of the method being performed by a computing system comprising at least one processor, the method comprising:

generating a URL access request for a webpage;
sending the URL access request to a network;
receiving and displaying the webpage with at least one of links or scripts deactivated;
communicating information related to the URL access request to a transcoding server;
receiving a transcoded webpage from the transcoding server corresponding to the webpage that has been processed to at least one of (a) block access to links to unacceptable URLs or (b) block execution of an unacceptable script, wherein the unacceptable URLs or the unacceptable script are determined by:
identifying at least a portion of at least one of the URL or the script;
comparing the identified at least a portion to a database comprising information representative of web resources identified as unsafe and information representative of user preferences identified by a user; and if the identified at least a portion matches information in the database, deciding whether the matching URL or script is unacceptable;

replacing the displayed webpage with the transcoded webpage when the transcoded webpage is received; and displaying the transcoded webpage.

7. The method of claim 6, further comprising adding the information representative of user preferences to the database, the information comprising URLs or scripts deemed unacceptable by the user.

8. The method of claim 6, wherein communicating the URL access request to the transcoding server using a browser component.

9. The method of claim 8, wherein the browser component is an add-on, extension or plug-in for a browser.

10. The method of claim 6, further comprising appending a tag to the URL access request.

11. The method of claim 10, wherein the tag comprises information regarding routing the webpage associated with the URL access request to the transcoding server.

12. The method of claim 10, wherein the tag further comprises information regarding a user device that requested access to the URL.

13. The method of claim 6 further comprising:

receiving, in response to sending the URL access request, the webpage associated with the requested URL; and sending the webpage to the transcoding server for transcoding.

14. The method of claim 13, further comprising preventing the webpage from being displayed until the transcoded webpage is received.

15. Apparatus for providing safe web browsing, comprising:

a browser interface module for receiving a webpage associated with a uniform resource locator (URL), the webpage comprising a referenced link or a script;

a database comprising information representative of web resources identified as unsafe and information representative of user preferences identified by a user, the database information comprising at least one of URLs or scripts used in determining if any of the URL, the referenced link, or the script are deemed unacceptable, wherein determining if any of the URL, the referenced link, or the script are deemed unacceptable comprises:

identifying at least a portion of at least one of the URL, the referenced link, or the script;

comparing the identified at least a portion to the database; and if the identified at least a portion matches information in the database, deciding whether the matching URL, referenced link, or script is unacceptable; and a transcoding module comprising at least one computer processor for transcoding the webpage to block access to any of the URL, the referenced link or script deemed unacceptable and for sending the transcoded webpage to a user device that requested access to the webpage associated with the URL, wherein the webpage is first received and displayed with at least one of a link or script deactivated, and wherein the displayed webpage is replaced with the transcoded webpage.

16. The apparatus of claim 15 further comprising a customization module for customizing a procedure for determining which at least one link or script is deemed unacceptable.

17. The apparatus of claim 15 wherein the database comprises at least one of a URL database or a script database.

18. Apparatus for providing safe web browsing, comprising:

a user device for generating and communicating a Unified Resource Locator (URL) access request to a network, wherein the URL access request is associated with a webpage comprising at least one of a referenced link or a script located at the URL, receiving and displaying the webpage with at least one of links or scripts deactivated, and replacing the displayed webpage with a transcoded webpage when the transcoded webpage is received; and a transcoding server, coupled to the network, for receiving information regarding the URL access request, receiving the webpage associated with the URL, determining if any of the URL, the referenced link, or the script are deemed unacceptable, and transcoding the webpage to block access to any URL, link or script deemed unacceptable, wherein determining if any of the URL, the referenced link, or the script are deemed unacceptable comprises:

identifying at least a portion of at least one of the URL, the referenced link, or the script;

comparing the identified at least a portion to a database comprising information representative of web resources identified as unsafe and information representative of user preferences identified by a user; and if the identified at least a portion matches information in the database, deciding whether the matching URL, referenced link, or script is unacceptable.

\* \* \* \* \*